(12) United States Patent
Nguyen (10) Patent No.: US 6,191,642 B1
(45) Date of Patent: Feb. 20, 2001

(54) CHARGE PUMP CIRCUIT

(75) Inventor: Tam Nguyen, San Jose, CA (US)

(73) Assignee: Silicon Storage Technology, Inc., Sunnyvale, CA (US)

(*) Notice: Under 35 U.S.C. 154(b), the term of this patent shall be extended for 0 days.

(21) Appl. No.: 09/281,570

(22) Filed: Mar. 30, 1999

(51) Int. Cl.[7] ........................................... G05F 1/10

(52) U.S. Cl. .............................................. 327/536

(58) Field of Search ................... 327/530, 534, 327/535, 536

(56) References Cited

U.S. PATENT DOCUMENTS 5,140,182 * 8/1992 Ichimura ..................... 307/296.1

* cited by examiner

Primary Examiner—Jeffrey Zweizig
(74) Attorney, Agent, or Firm—Ronald L. Yin; Limbach & Limbach LLP (57) ABSTRACT

A charge pump circuit is provided which includes a plurality of successively coupled charge pump stages. Each of these successively coupled charge pump stages receives at least one input signals and at least one clock input signals, and in accordance therewith, conveys at least one output signal. Significantly, at least one output signal of a prior charge pump stage is substantially equal to at least one input signal of a next adjacent charge pump stage, so that the prior adjacent charge pump stage will be effectively shut off, so that reverse current flow can be prevented through the charge pump circuit.

24 Claims, 6 Drawing Sheets

| | 150 | 151 | 152 | 153 | 154 | 155 | 156 | 159 | 157 | 158 | 160 | 161 |
|---|---|---|---|---|---|---|---|---|---|---|---|---|
| $t_1$ | $V_{CC}$ | O | O | $V_{CC}$ | $V_{CC}$ | O | $2V_{CC}$ | $V_{CC}$ | BLOCK | BLOCK | BLOCK | BLOCK |
| $t_2$ | O | $2V_{CC}$ | $V_{CC}$ | $2V_{CC}$ | $3V_{CC}$ | $V_{CC}$ | O | O | $2V_{CC}$ | $2V_{CC}$ | BLOCK | BLOCK |
| $t_3$ | $V_{CC}$ | O | O | $V_{CC}$ | $V_{CC}$ | O | $2V_{CC}$ | $V_{CC}$ | $4V_{CC}$ | $3V_{CC}$ | $3V_{CC}$ | $3V_{CC}$ |
| $t_4$ | O | $2V_{CC}$ | $V_{CC}$ | $2V_{CC}$ | $3V_{CC}$ | $V_{CC}$ | O | O | $2V_{CC}$ | $2V_{CC}$ | $3V_{CC}$ | $3V_{CC}$ |

*FIG. 7B*

CHARGE PUMP CIRCUIT

TECHNICAL FIELD OF THE INVENTION

This invention relates to voltage generation circuits, and more particularly, to a charge pump circuit suitable for use in flash memories which can be used for very low voltage operation.

BACKGROUND OF THE INVENTION

A flash memory is a type of nonvolatile memory cell that is electrically reprogrammable. Typically, the memory cells are arranged in an array of rows and columns. These memory cells typically include floating gate transistors. These transistors can be programmed or erased by applying voltage between a control electrode and the drain, source or substrate. The voltage applied during programming ($V_p$) or erasing ($V_e$) is a "high" voltage, higher than the input voltage, or $V_{cc}$, necessitating a charge pump to pump the voltage from $V_{cc}$ to $V_p$ or $V_e$.

The charge pump increases a small input voltage (for example, $V_{cc}$) into the larger voltages that are passed to the word lines and bit lines of semiconductor devices. These voltages affect the writing or erasing of data to and from the memory device. The charge pump usually includes a number of serially-connected pump stages that are driven by two non-overlapping clock signals. The serially-connected pump stages multiply the amplitude of the clock signals. The actual voltage obtained at the charge pump output terminal depends upon the number of pump stages, the clock frequency, and on the charge transfer efficiency of each pump stage.

Currently, charge pumps are constructed using several bootstrap capacitors having the same size capacitance (C) at each respective node of the charge pump. A bootstrap capacitor is simply a capacitor connected to each respective node of a charge pump.

As the input voltage $V_{cc}$ decreases, due to the flash memory being used in low voltage environments, such as battery operation, the number of stages necessary to generate the same high output voltages also increases. Typically, the voltage required to program or erase a flash memory array is in the range of about 10 volts.

Figure 1:
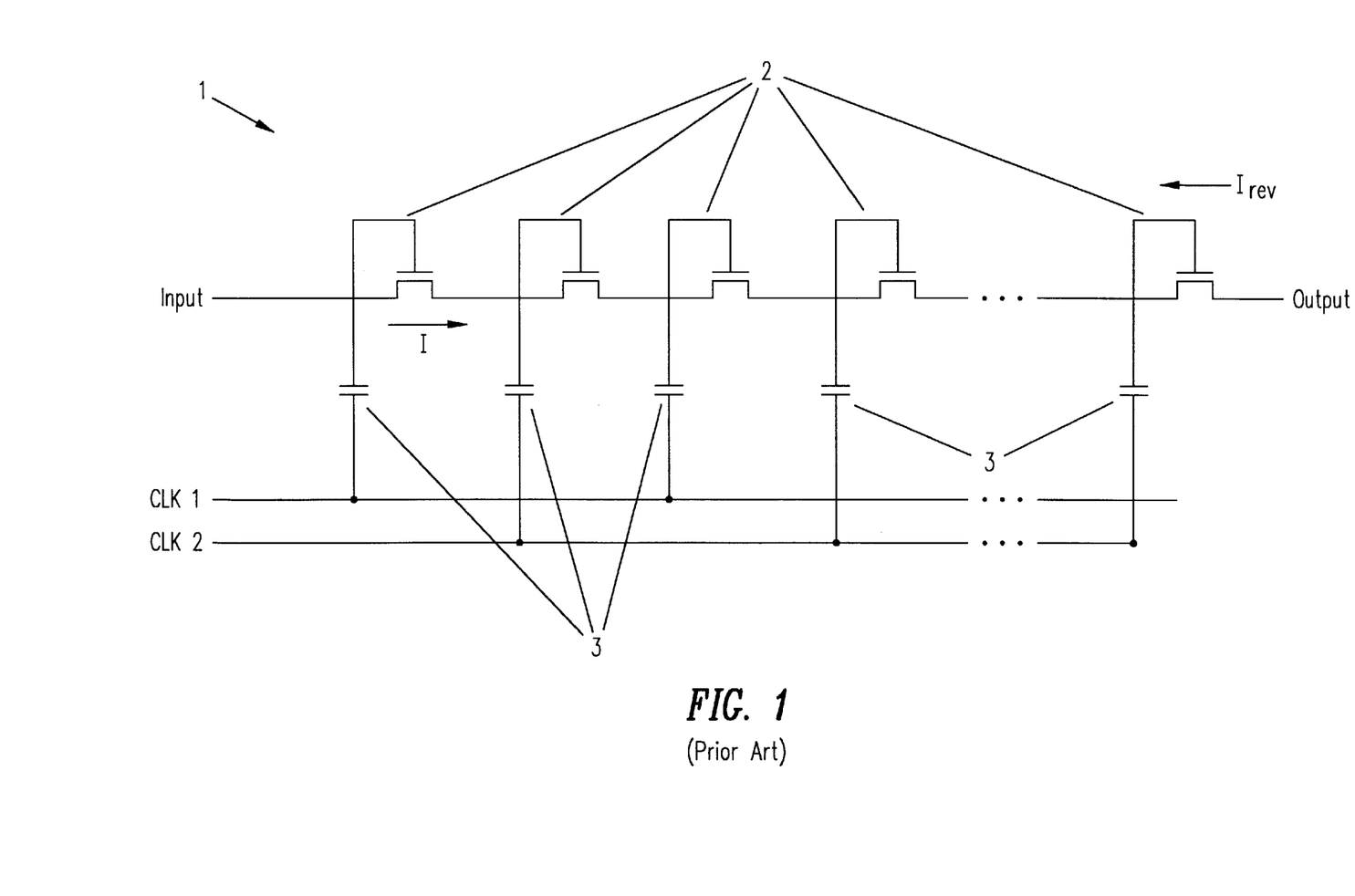
FIG. 1 is a simplified charge pump circuit of the prior art.

FIG. 1 shows a conventional prior art charge pump 1. The prior art charge pump 1 consists of n stages, each stage is comprised of a diode means 2 and a capacitor 3. Typically, the diode means 2 is a field effect transistor 2 with the gate terminal connected to a source/drain terminal causing the FET to act as a diode, and the capacitor 3 is coupled to the source/drain terminal of the field effect transistor 2.

This capacitor 3 stores a charge $V_{cc}-V_{Th}$ at each successive stage, thereby increasing the voltage potential by $V_{cc}-V_{Th}$ at each successive stage. Thus, the current, I, across one stage n of the charge pump 1 is proportional to $n(V_{cc}-V_{Th})$, where $V_{Th}$ is the threshold voltage of the transistor 2 and n is the number of stages. Thus, at each stage, the voltage is pumped up proportional to $n(V_{cc}-V_{Th})$. However, in this prior art charge pump 1, reverse current flow is not prevented since adjacent transistors 2 are not switched OFF.

Thus, a drawback to prior art charge pumps is that as the number of stages increases, the power required to drive the charge pump also increases due to the increased number of capacitors in the charge pump and the reverse current flow. There is a need to reduce the size of these power supplies, by designing a more sophisticated charge pump which operates at a lower voltage than previous charge pumps, thereby reducing the amount of power needed to drive the device.

It is therefore desirable to provide a pump voltage circuit which can be used for very low voltage operation.

SUMMARY OF THE INVENTION

A charge pump circuit is provided which includes a plurality of successively coupled charge pump stages. Each of these successively coupled charge pump stages receives at least one input signal and at least one clock input signal, and in accordance therewith, generates at least one output signal. Significantly, at least one output signal of a prior adjacent charge pump stage is substantially equal to at least one input signal of a next adjacent charge pump stage, so that the prior adjacent charge pump stage will be effectively shut off, so that reverse current flow can be prevented through the charge pump circuit.

Figure 4:
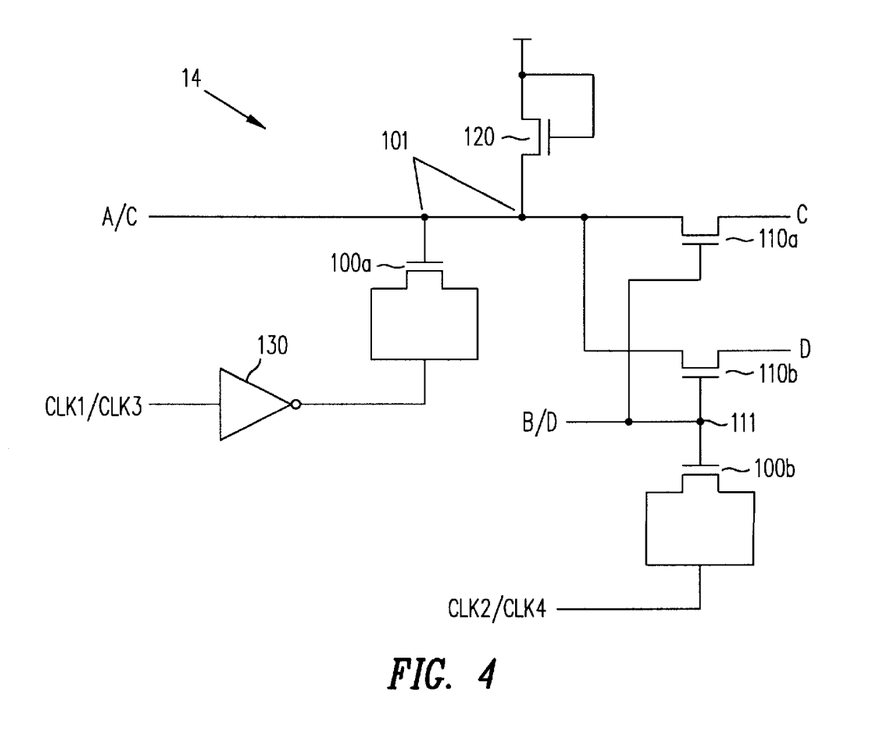
FIG. 4 is a detailed circuit diagram of one stage of the charge pump circuit shown in FIG. 2C.

For example, the gate of transistor 110a is bootstrapped to avoid a threshold voltage drop $V_t$ between input/output stages A and C. Therefore, the output current and voltage depend on $V_{cc}$ and not on $V_{cc}-V_t$.

Additionally, the main capacitor 100a (referred to as the charge pump capacitor 100a) is utilized in stage n to precharge the capacitor 100b (referred to as the bootstrap capacitor 100b) at stage n+1 through transistor 100b thereby effectively negating the threshold voltage drop $V_t$ between input/output stages A and D. Therefore, the precharge depends on $V_{cc}$ and not on $V_{cc}-V_t$.

Moreover, different clock phases are not necessary for the charge pump capacitor 100a and the gate terminals of transistors 110a and 110b. Therefore, the charge pump can operate at a very high frequency.

DETAILED DESCRIPTION OF THE PREFERRED EMBODIMENT

Figure 6:
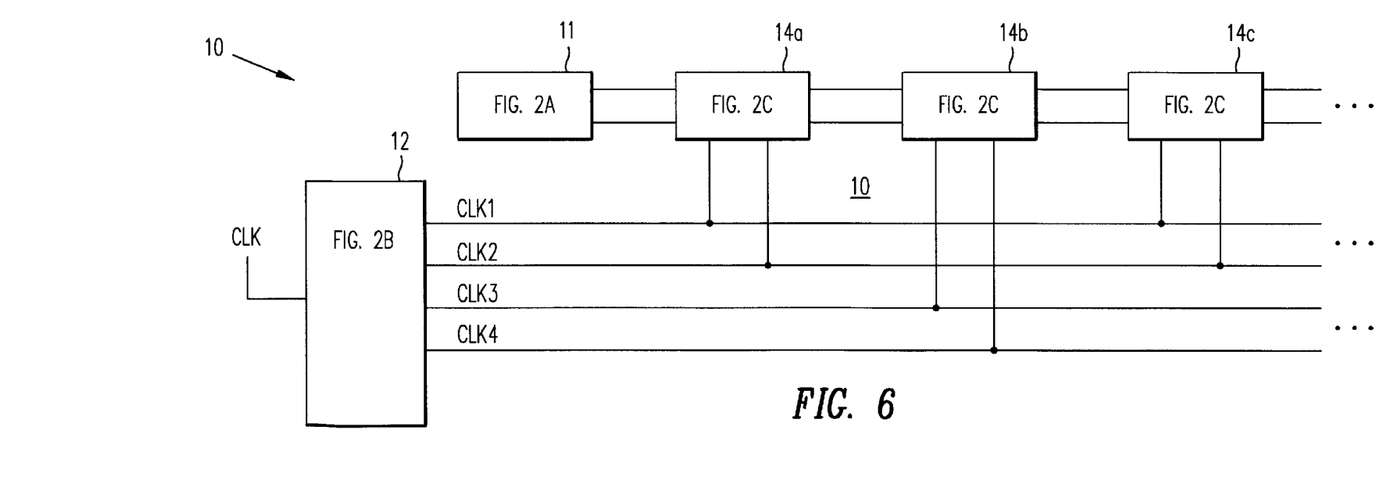
FIG. 6 is a schematic diagram of a charge pump of the present invention using the components shown in FIG. 2A, 2B and 2C.

Several separate circuit components 11, 12, 14 comprise the charge pump circuit 10 which is shown in FIG. 6. FIG. 6 shows a simple schematic diagram of the charge pump circuit 10. Note that the charge pump circuit is composed of the various circuit modules described herein with reference to FIGS. 2A–C. Note also that the input clock signals CLK1/CLK2 and CLK3/CLK4 are received by alternate circuit stages (represented by the block "FIG. 2C" in FIG. 6).

Figure 2A:
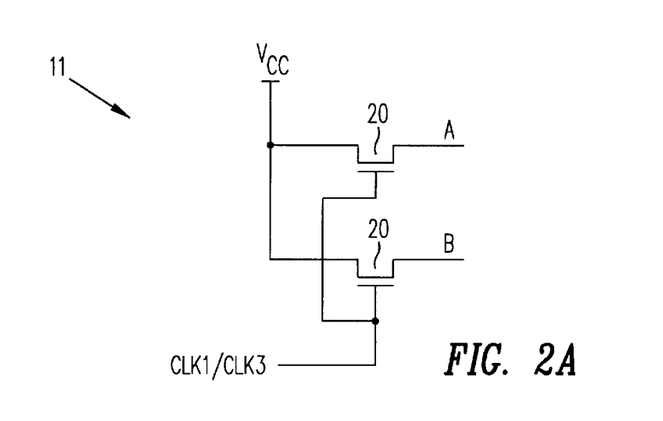
FIG. 2A is a simplified circuit diagram of one embodiment of the initial charge pump stage component module of the charge pump circuit of the present invention.

FIG. 2A shows a voltage source coupling circuit 11. This circuit 11 comprises first and second transistors 20 having their input terminals connected to voltage source $V_{cc}$. The gate terminals of these transistors 20 are connected to a clock signal, i.e. CLK1 or CLK3 (clock signal CLK3 will be the complemented signal of clock signal CLK1). Thus, depending on the logic level of the clock signal, the transistors 20 will be switched ON passing $V_{cc}$ to the component 14, or switched OFF, in which case no voltage is passed to the component 14.

Figure 2B:
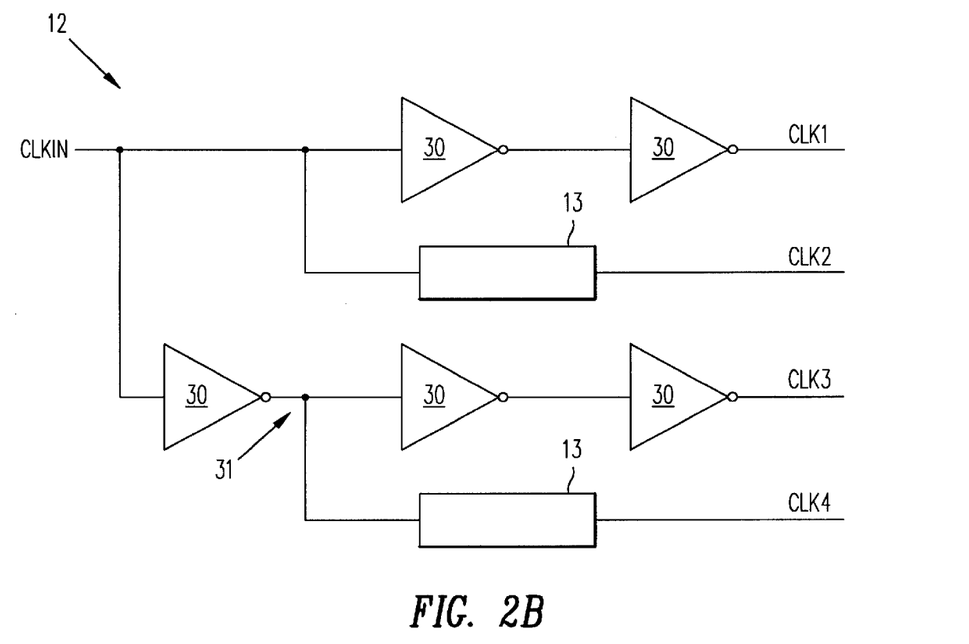
FIG. 2B is a simplified circuit diagram of one embodiment of the clock signal generator component module of the charge pump circuit of the present invention.

Another component 12, shown in FIG. 2B, is a clock signal generator circuit 12. That is, the clock signal CLKIN is split into four separate signals, CLK1, CLK2, CLK3 and CLK4. The circuit 12 comprises a plurality of inverters 30 and a voltage amplification inverter circuit 13. In the signal splitting circuit 12, the signal CLK1 is generated from a pair of series connected inverters 30 which receives as its input the signal CLKIN. Therefore, CLK1 has the same characteristics as CLKIN. However, signal CLK2 is generated from voltage amplification inverter circuit 13 (which will be explained in detail later in reference to FIG. 3). Thus, signal CLK2 will be the amplified complementary signal of CLK1. Signals CLK3 and CLK4 mirror respective signals CLK1 and CLK2, except that signals CLK3 and CLK4 are the inverse of signals CLK1 and CLK2. This is accomplished by addition of another inverter 30 prior to a node 31.

Figure 2C:
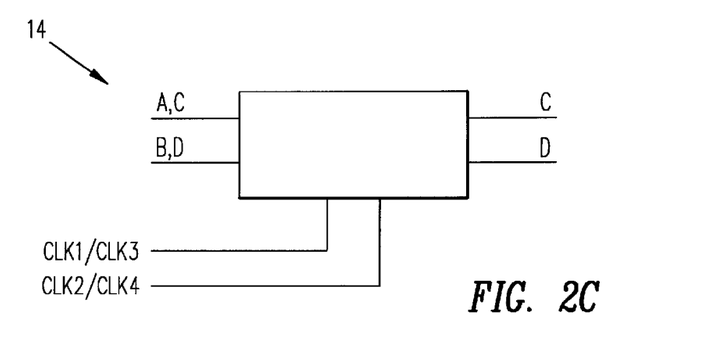
FIG. 2C is a simplified schematic diagram showing the inputs and outputs of a charge pump stage of the charge pump circuit of the present invention.

Referring to FIG. 2C, a charge pump cell component 14 is shown. The charge pump cell 14 receives input signals A and B from the voltage source coupling circuit 11, or from outputs C and D of another pump cell 14, and signals CLK1 and CLK2, or CLK3 and CLK4 from the clock splitting circuit 12. Signals C and D will be output to the next stage n+1, in which signal C is supplied as input signal A, and signal D is supplied as input signal B of the previous stage n. Stage n+1 will receive clock signals CLK3 and CLK4 which mirror clock signals CLK1 and CLK2 except that signals CLK3 and CLK4 are the inverse of signals CLK1 and CLK2. Thus, adjacent stages will receive inverted clock signals CLK1/CLK3 and CLK2/CLK4.

Figure 3:
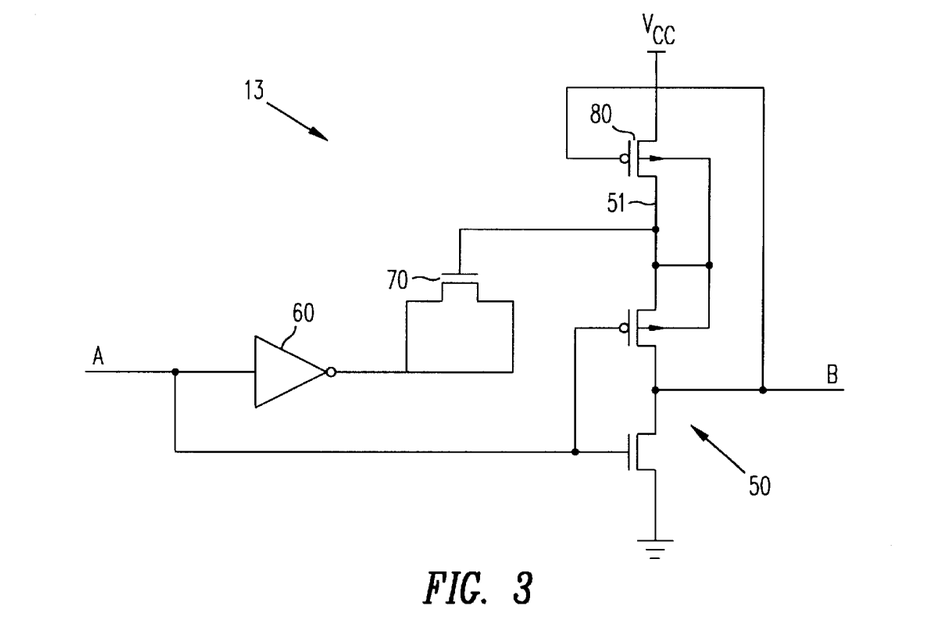
FIG. 3 is a circuit diagram of a boost inverter circuit component of the clock signal generator shown in FIG. 2B.

FIG. 3 shows the boost inverter circuit 13. This circuit 13 comprises a CMOS inverter 50, an inverter 60, a capacitor 70; and a transistor 80. The CMOS inverter 50 has its gate terminals controlled by signal CLKIN or the signal at node 31.

Transistor 80 has its source terminal connected to voltage source $V_{cc}$. The cathode terminal of a capacitor 70 is coupled to the drain terminal of transistor 80 which is coupled to the CMOS inverter 50 at a common node 51. The anode terminal of the capacitor 70 is connected to the output of inverter 60 whose input receives signal CLKIN or the inverse thereof at node 31. it should be noted that transistor 80 is a depletion type p-channel device, as is the p-channel device of the CMOS inverter 50.

In operation, when the input signal at node A is $V_{cc}$, the inverter 50 is ON. This leads to node B pulled down to 0V. With node B at 0V, transistor 80 turns ON causing $V_{cc}$ to be supplied to the cathode terminal of capacitor 70. The anode terminal of capacitor 70 is at 0V (the output of inverter 60). This then causes the difference of $V_{cc}$ to be stored in the capacitor 70.

When the input signal at node A is 0V, the output of inverter 60 is at $V_{cc}$. This then pumps the cathode terminal of capacitor 70 to $2V_{cc}$. With node A at 0V, it turns ON the PMOS transistor of the inverter and causes node B to be connected to the cathode terminal of capacitor 70 ($2V_{cc}$)

Thus, referring back to FIG. 2B, clock signals CLK2 and CLK4 will range from 0V to $2V_{cc}$, where CLK4 is the inverse of signal CLK2.

FIG. 4 shows the voltage pump cell 14. Each voltage pump cell 14 is one stage n of the charge pump 10. Each charge pump cell 14 comprises a first and second capacitor 100a and 100b, a first and second transistor 110a and 110b, a diode 120 and an inverter 130. First and second transistors 110a and 110b have their drain terminals connected to the input terminal A, whereas the source terminal of transistor 110a is connected to the output terminal C and the source terminal of transistor 110b is connected to the output terminal D. The gate terminals of transistors 110a and 110b are connected to input terminal B. Further, a capacitor 100b is coupled to the gates of transistors 110a and 110b and to input terminal B at a common node 111. Clock signal CLK2 or CLK4 is supplied to another terminal of capacitor 100b.

The cathode terminal of capacitor 100a is coupled to the drain terminals of transistors 110a and 110b, through common node 101, whereas the anode terminal of the capacitor 100a is connected to an inverter 130 which is connected to a clock input terminal to receive clock signal CLK1 or CLK3. The diode 120 has its first end coupled to the drain terminals of transistors 110a and 110b, through the common node 101, whereas its second end is connected to a voltage source $V_{cc}$.

Capacitor 100b is a bootstrap type, which pulls down the stage, when the transistors switch OFF, thereby ensuring no reverse current flows through the charge pump cell 14. This shutting off feature is effectuated by the like amplitudes of input signal B of a prior adjacent stage and input signal A of a successive adjacent stage. Since they are equal, this ensures the transistors 110a and 110b are OFF and that no reverse current flows.

Figure 7A:
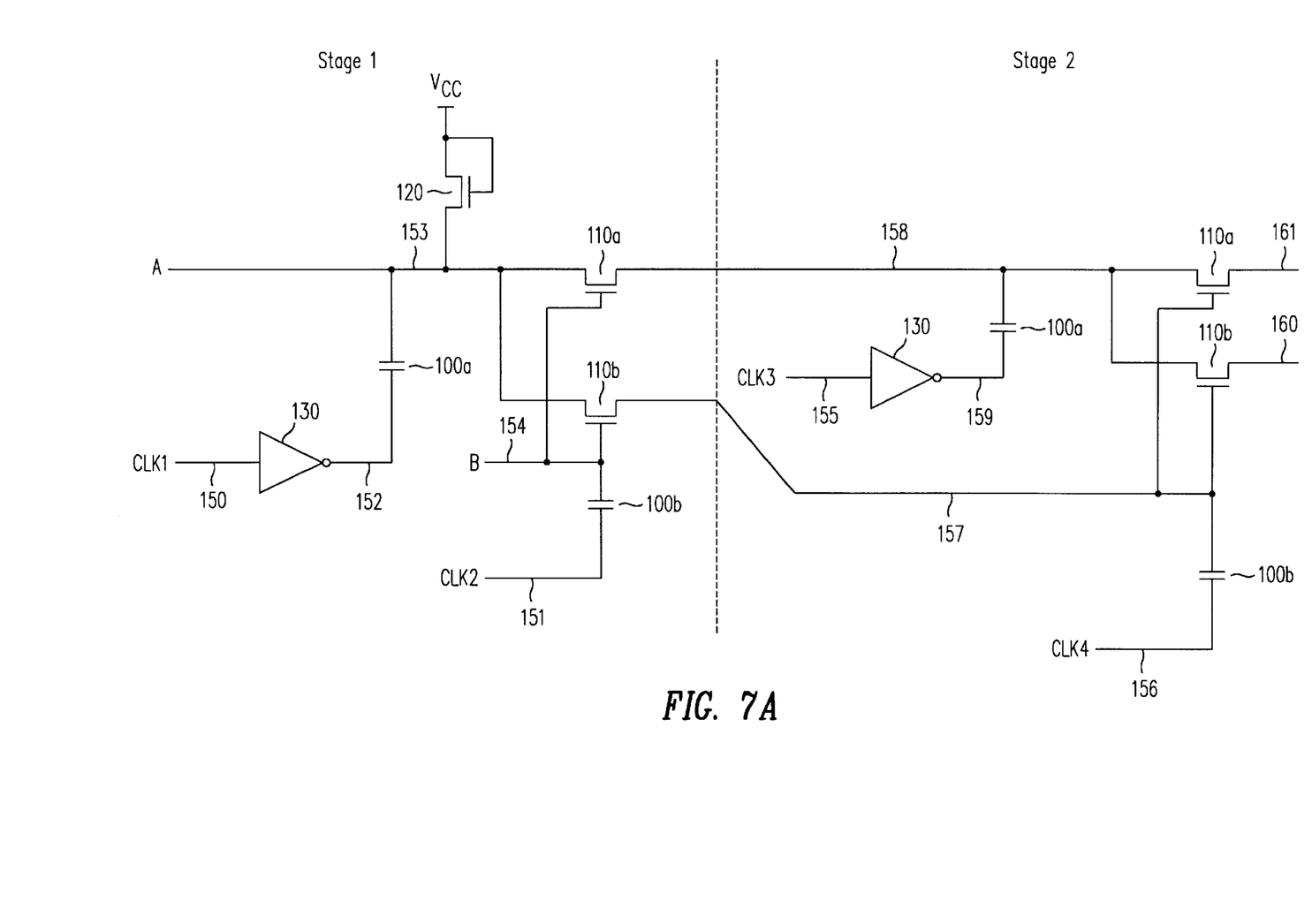
FIG. 7A is a representation of two successive charge pump stages of the charge pump circuit.

For example, FIG. 7A shows two successive charge pump stages, referenced "Stage 1" and "Stage 2" in FIG. 7A. In FIG. 7A, Stage 1 is intended to be the initial stage of the charge pump circuit 10 and Stage 2 is intended to be a charge pump cell 14 in the charge pump circuit 10. Each of the charge pump stages shown in FIG. 7A comprises a charge pump cell 14 as illustrated in FIG. 4, and described herein. With reference to FIG. 7A, the following nodes are of interest in illustrating the switching feature of the present invention. Node 150 represents an input of Stage 1, in this case signal CLK1. Node 151 represents another input of Stage 1, in this case signal CLK2. Node 152 represents the output of the inverter 130 of Stage 1. Node 153 represents the potential at the cathode terminal of capacitor 100a. Finally, node 154 represents yet another input of Stage 1, in this case input B.

Node 155 represents an input of Stage 2, in this case signal CLK3. Node 156 represents another input of Stage 2, in this case signal CLK4. Node 157 represents yet another input of Stage 2, in this case input B, which is the output D of Stage 1. Node 158 represents yet another input of Stage 2, in this case input A, which is the output C of Stage 1. Node 159 represents the output of the inverter 130 of Stage 2. Node 160 represents an output of Stage 2, in this case output D. Finally, node 161 represents another output of Stage 2, in this case output C.

Figure 7B:
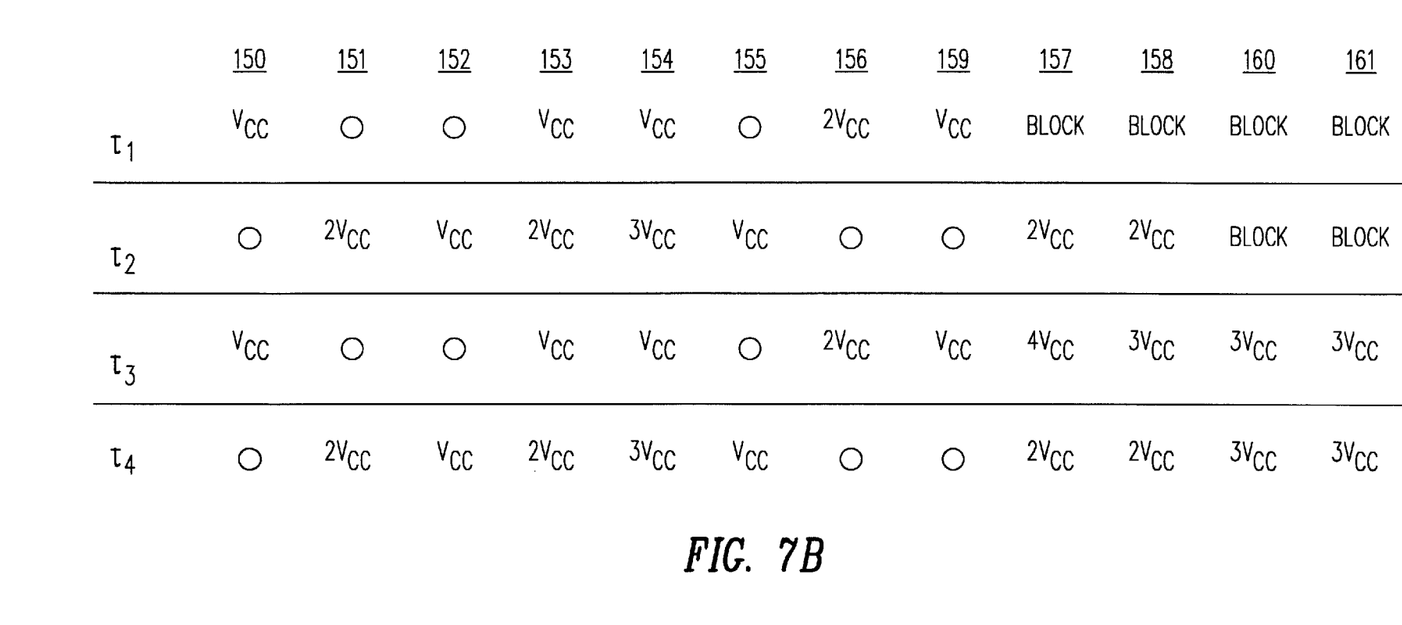
FIG. 7B is a diagram of the potentials at various nodes shown in FIG. 7A during the time variance $t_1$ to $t_4$.

FIG. 7B is a diagram of the potentials of each of the nodes referenced in FIG. 7A at different times $t_1$, to $t_4$. As shown in FIG. 7B, at a time $t_1$, the nodes have the following potentials: node 150, $V_{cc}$ (signal CLK1); node 151, 0 (complementary relationship between signal CLK1 and CLK2); node 152, 0; nodes 153 and 154, $V_{cc}$; node 155, 0 (signal CLK3 and signal CLK1 are complementary); node 156, $2V_{cc}$ (due to the effects of circuit 13 shown in FIG. 3); node 159, $V_{cc}$. The potentials at nodes 157, 158, 160 and 161 are unknown since these nodes are effectively blocked due to the switching feature described earlier.

At time $t_2$, the nodes have the following potentials. Node 150, 0; node 151, $2V_{cc}$ (due to the effect of circuit 13 shown in FIG. 3); node 152, $V_{cc}$; node 153, $2V_{cc}$ (due to the charge on the capacitor 100a of Stage 1); node 154, $3V_{cc}$ (due to the charge on capacitor 100b of Stage 1); node 155, $V_{cc}$; node 156, 0; node 159, 0.

At time $t_2$, node 157 has a potential of $2V_{cc}$, which is the output D from Stage 1. Also, node 158 has a potential of $2V_{cc}$ which is the output C from Stage 1. However, nodes 160 and 161 are still blocked and their potentials are unknown due to the switching feature of the present invention.

At time $t_3$, the nodes will have the same potentials as the nodes at time $t_1$, except that at time $t_3$, node 157 has a potential of $4V_{cc}$, which is the output D from Stage 1. Node 158 has a potential of $3V_{cc}$ which is the output: C from Stage 1.

At time $t_3$, Stage 1 and Stage 2 are no longer blocked, and now the potentials at nodes 160 and 161 can be determined, and are each $3V_{cc}$.

Finally, at time $t_4$, the nodes will have the same potentials as the nodes at time $t_2$, except that at time $t_4$, since Stage 1 and Stage 2 are no longer blocked, the potentials at nodes 160 and 161 can be determined, and are each $3V_{cc}$.

Figure 5:
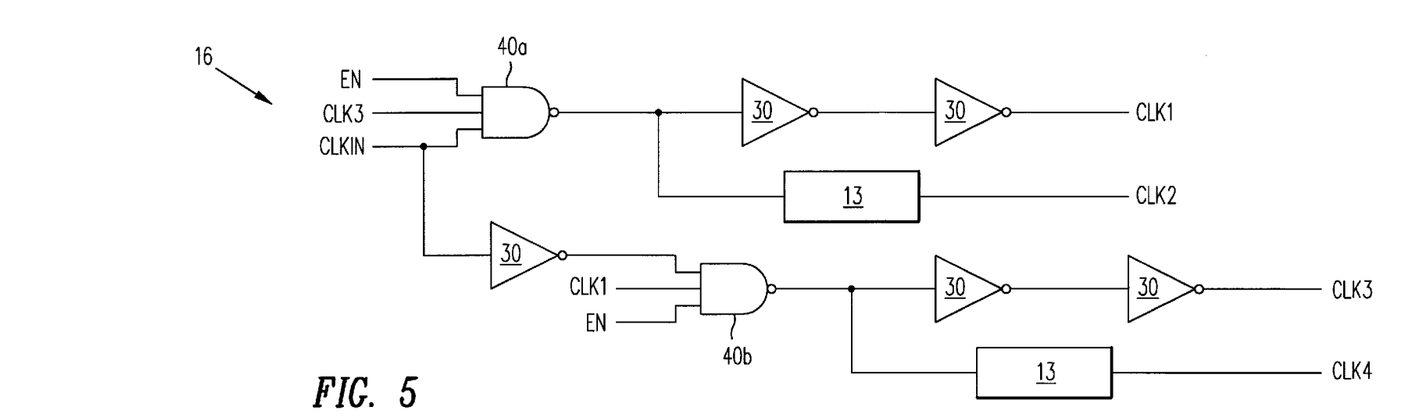
FIG. 5 is a circuit diagram of another embodiment of the clock signal generator component module of the charge pump circuit of the present invention.

A second embodiment of the clock signal generator component of the charge pump 10 is shown in FIG. 5. Similarities between this embodiment and the previous embodiment need not be explained here, as their operation is the same. However, what is different in this embodiment is the composition of the clock splitting circuit 16, shown in FIG. 5. In the second embodiment, the clock signal CLKIN is split into four separate signals, CLK1, CLK2, CLK3 and CLK4, just as in the first embodiment. However, in this second embodiment, the circuit 16 comprises a plurality of inverters 30, a boost inverter circuit 13, and a plurality of NAND gates 40a, 40b.

Initially, the CLKIN signal, together with an enable signal EN and clock signal CLK3 are compared through a three-input NAND gate 40a, and the signal CLK1 is generated by propagating the output of the NAND gate 40a through a pair of series connected inverters 30.

However, signal CLK2 is generated propagating the output of the NAND gate 40a through voltage amplification inverter circuit 13. Thus, signal CLK2 will be the amplified complementary signal of CLK1.

Likewise, signals CLK3 and CLK4 mirror respective signals CLK1 and CLK2, except that signals CLK3 and CLK4 are the inverse of signals CLK1 and CLK2. This is accomplished by inverting the CLKIN signal and comparing that inverted signal with enable signal EN and signal CLK1 by NAND gate 40b. This output from the NAND gate 40b is then propagated through two inverters 30 to generate signal CLK3, or a voltage amplification circuit 13 to generate signal CLK4. Thus, this ensures CLK1/CLK3 and CLK2/CLK4 do not overlap, i.e. CLK1/CLK3 are complementary and CLK2/CLK4 are complementary.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A charge pump circuit, comprising:
    a plurality of staging means, each for receiving two input signals, for increasing the voltage of said input signals, and for supplying said input signals with increased voltage as two output signals;
    said plurality of staging means being serially connected with the output signals of one stage supplied as the input signals of a next adjacent stage; and
    each staging means further comprising switch means for selectively isolating said staging means from a next adjacent staging means.

2. The charge pump circuit of claim 1, wherein said staging means further comprises capacitive means for increasing the voltage of said input signal.

3. The charge pump circuit of claim 2, wherein said switch means comprises a field effect transistor.

4. The charge pump circuit of claim 3, wherein said staging means further comprises a first clock signal coupled to one of said two input terminals and a second clock signal coupled to the second of said two input terminals.

5. The charge pump circuit of claim 4, wherein said first clock input signal and second clock input signal supplied to the same charge pump circuit stage are complementary signals of one another with said second clock signal being larger in voltage amplitude than said first clock signal; and
    wherein said first clock input signal of one charge pump circuit stage is a complementary signal of said first clock input signal supplied to an immediate adjacent charge pump circuit stage.

6. A charge pump circuit, comprising:
    a plurality of input terminals;
    a plurality of output terminals; and
    a plurality of successively coupled charge pump circuit stages, coupled between said input terminals and said output terminals, each of said plurality of successively coupled charge pump circuit stages for receiving two input signals, and two clock signals, and for generating two respective output signals, which are supplied as input signals to an immediate adjacent circuit stage.

7. The charge pump circuit of claim 6 wherein each charge pump circuit stage further comprises
    a switch interposed between one of said two input signals and one of said two respective output signals, and operable by another of said two input signals.

8. The charge pump circuit of claim 7, wherein said two output signals have respectively larger voltage amplitudes than said two input signals.

9. The charge pump circuit of claim 7, wherein said two clock signals comprise non-overlapping clock signals.

10. The charge pump circuit of claim 6, wherein said plurality of successively coupled charge pump circuit stages further comprises a first capacitor, coupled between a first clock signal and one of said two input signals.

11. The charge pump circuit of claim 10, wherein said plurality of successively coupled charge pump circuit stages further comprises a second capacitor, coupled between a second clock signal and one of said two input signals.

12. The charge pump circuit of claim 11, wherein said first clock input signal and second clock input signal supplied to the same charge pump circuit stage are complementary signals of one another with said second clock signal being larger in voltage amplitude than said first clock signal; and wherein said first clock input signal of one charge pump circuit stage is a complementary signal of said first clock input signal supplied to an immediate adjacent charge pump circuit stage.

13. The charge pump circuit of claim 10, wherein said plurality of successively coupled charge pump circuit stages further comprises a plurality of transistors, coupled with said first capacitor, each of said plurality of transistors configured to receive said at least one of said two input signals and generate said at least one of said two output signals, and a second capacitor, having one terminal coupled to the gate terminal of each of said plurality of transistors and another terminal coupled to receive said second clock signal.

14. The charge pump circuit of claim 13, wherein said plurality of transistors comprises a plurality of NMOS transistors.

15. A charge pump circuit, comprising:
a plurality of input terminals;
a plurality of output terminals; and
a plurality of successively coupled charge pump circuit stages, coupled between said input terminals and said output terminals, each of said plurality of successively coupled charge pump circuit stages for receiving a first input signal, a second input signal, a first clock input signal, and a second clock input signal, and in accordance therewith for generating a respective first output signal and a second output signal;
wherein said plurality of successively coupled charge pump circuit stages are connected with a first output signal and a second output signal of one charge pump circuit stage supplied as a first input signal and a second input signal, respectively, of a next adjacent charge pump circuit stage;
wherein said first clock input signal and second clock input signal supplied to the same charge pump circuit stage are complementary signals of one another with said second clock signal being larger in voltage amplitude than said first clock signal; and
wherein said first clock input signal of one charge pump circuit stage is a complementary signal of said first clock input signal supplied to an immediate adjacent charge pump circuit stage.

16. The charge pump circuit of claim 15, wherein said first output signal and said second output signal each have respectively larger voltage amplitudes than said first input signal and said second input signal.

17. The charge pump circuit of claim 15, wherein said plurality of successively coupled charge pump circuit stages further comprises a first capacitor, coupled between a first clock signal and one of said two input signals.

18. The charge pump circuit of claim 17, wherein said plurality of successively coupled charge pump circuit stages further comprises two transistors, coupled with said first capacitor, at least one of said two transistors for receiving said first input signal and for generating said first output signal, at least another one of said two transistors for receiving said first input signal and for generating said second output signal, and a second capacitor, coupled to the gate terminal of each of said two transistors.

19. The charge pump circuit of claim 18, wherein said plurality of transistors comprises a plurality of NMOS transistors.

20. A charge pump circuit, comprising:
a plurality of successively connected charge pump circuit stages, each comprising:
a first input terminal;
a second input terminal;
a first clock input terminal;
a second clock input terminal; and
a first capacitor having a first terminal and a second terminal, the first terminal of said first capacitor coupled to said first clock input terminal and the second terminal of said first capacitor coupled to said first input terminal to form a first node;
a first field effect transistor and a second field effect transistor, each transistor having a first terminal, a second terminal with a channel therebetween, and a gate for controlling the flow of current between the first terminal and the second terminal; the first terminal of each of said first field effect transistor and said second field effect transistor coupled to said first node, the second terminal of said first field effect transistor coupled to a first output terminal and the second terminal of said second field effect transistor coupled to a second output terminal; and
a second capacitor having a first terminal and a second terminal, the first terminal of said second capacitor coupled to said second clock signal input terminal and the second terminal of said second capacitor coupled to said second input terminal to form a second node, wherein the gate terminals of each of said first field effect transistor and said second field effect transistor are coupled to said second node.

21. A charge pump circuit comprising:
a plurality of successively coupled charge pump circuit stages, each stage comprising
two input terminals for receiving two input signals;
two clock terminals for receiving two clock signals, one having a greater voltage than the other;
means for boosting each of said input signals by clock signal to generate two boosted signals, one having a greater voltage than the other;
switch means having two paths, each controlled by said one boosted signal for supplying the other boosted signal as two output signals; and
said two output signals of one stage supplied as input signals to an immediate adjacent stage.

22. The charge pump circuit of claim 21 wherein said means for boosting comprises a capacitor.

23. The charge pump circuit of claim 21 wherein said switch means comprises two transistors, each having two terminals and a gate for controlling the flow of current therebetween, and wherein said one boosted signal is supplied to the gate of each of said two transistors, the other boosted signal supplied to one terminal of each of said two transistors, with the other terminal of each of said two transistors supplying said two output signals.

24. A method of boosting the voltage of a signal, said method comprising:
connecting a plurality of successively coupled charge pump circuit stages, each stage having two inputs and two outputs, with the two outputs of one stage connected to the two inputs of an immediate adjacent stage;
supplying two clock signals to each stage, with one of said clock signals having greater voltage than the other;
supplying two input signals along said two inputs of a first stage;
boosting each of said two input signals by a clock signal to generate two boosted signals, with one boosted signal having greater voltage than the other boosted signal;
passing the other boosted signal through a switch, controlled by the one boosted signal, as the two output signals of the stage.

* * * * *